W. H. SCHULTE.
VALVE MECHANISM.
APPLICATION FILED APR. 27, 1910.
974,925.
Patented Nov. 8, 1910.
2 SHEETS—SHEET 1.
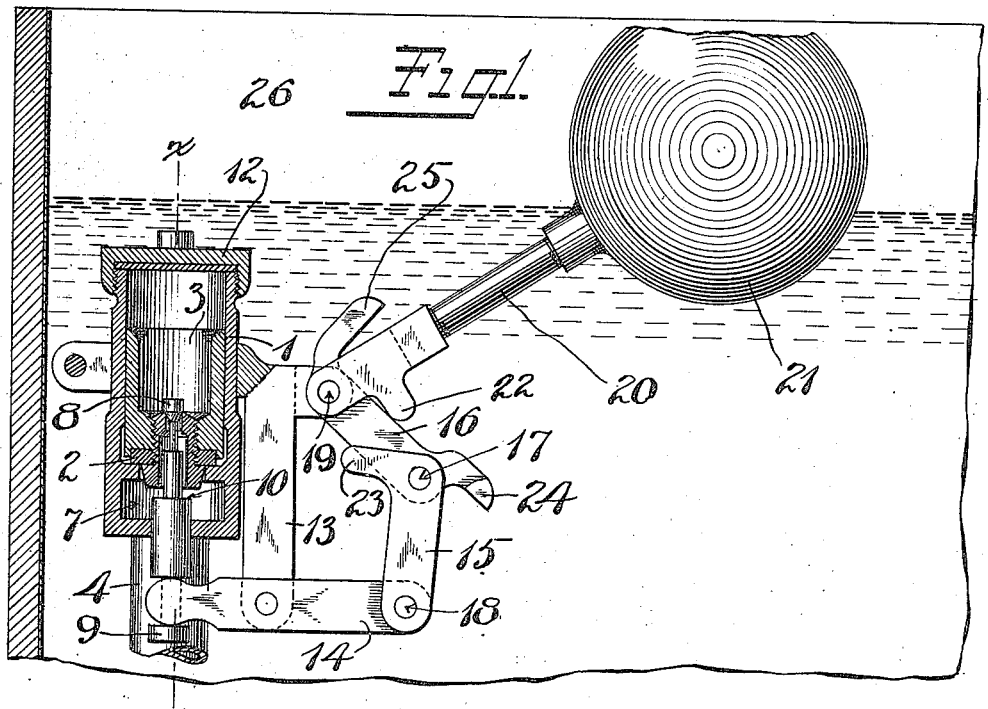
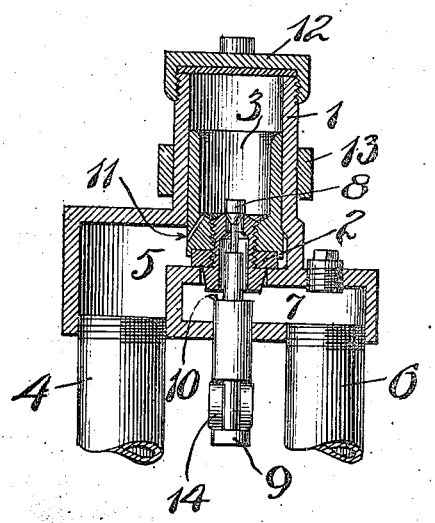
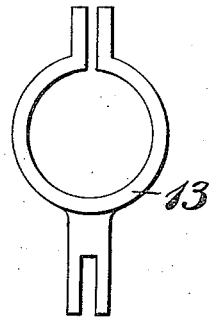
Witnesses:
Inventor
W. H. SCHULTE
By his Attorneys W. H. SCHULTE.
VALVE MECHANISM.
APPLICATION FILED APR. 27, 1910.
974,925.
Patented Nov. 8, 1910.
2 SHEETS—SHEET 2.
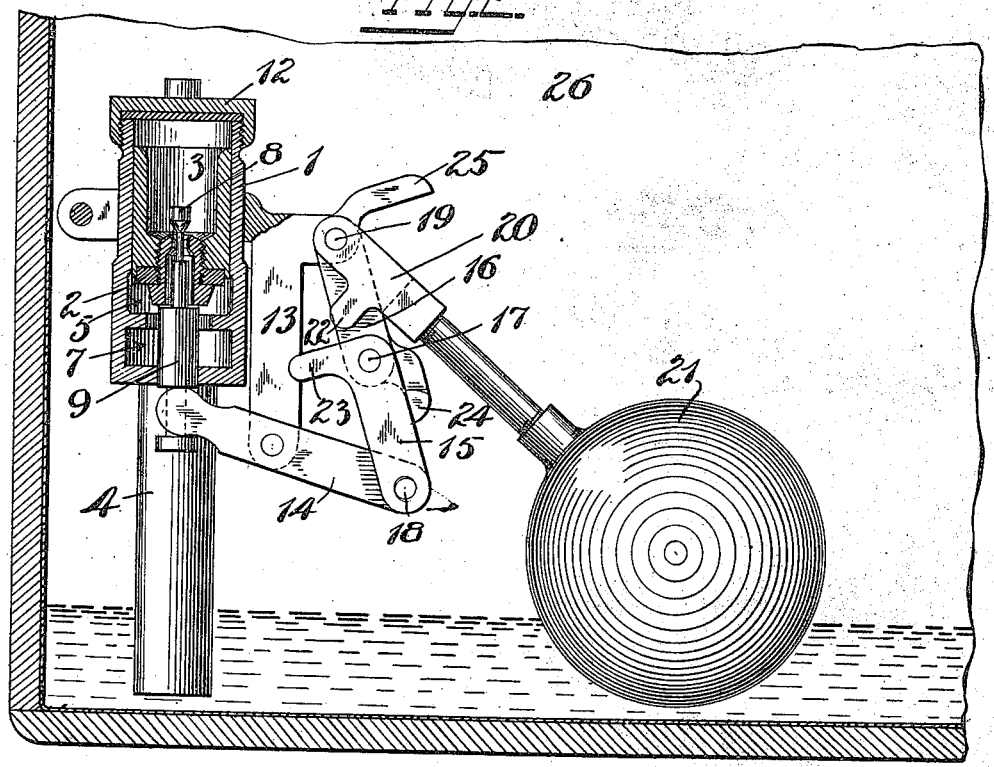
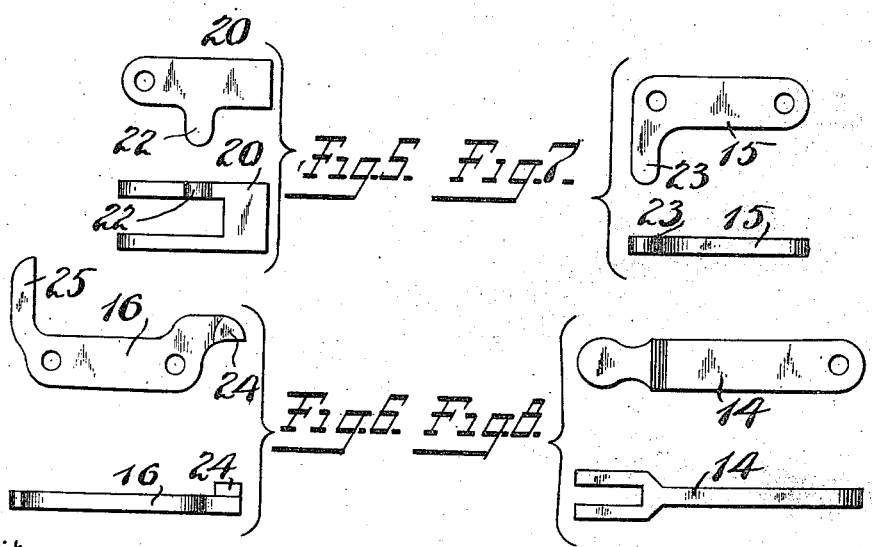
Witnesses:
Fred K. M. Dannenfelser
Chas. A. Peard
Inventor
W. H. SCHULTE
By his Attorneys

UNITED STATES PATENT OFFICE.

WILLIAM H. SCHULTE, OF TRENTON, NEW JERSEY.

VALVE MECHANISM.

974,925.  Specification of Letters Patent.  Patented Nov. 8, 1910.

Application filed April 27, 1910. Serial No. 558,039.

*To all whom it may concern:*

Be it known that I, WILLIAM H. SCHULTE, a citizen of the United States, residing at Trenton, Mercer county, New Jersey, have invented certain new and useful Improvements in Valve Mechanism, of which the following is a full, clear, and exact description.

My invention relates to improvements in lever controlled valves, and consists in certain novel features of construction hereinafter fully pointed out, by which many advantages hereinafter more particularly mentioned are attained.

In the drawings, I have shown the invention as applied to a tank in which a float is affixed to the controlling lever, whereby when the water level ascends to a certain height the valve will close, which lever, when the water level descends, moves in a direction to cause the valve to open.

In the drawings Figure 1 is a view of a part of the tank with my improved valve located therein, certain parts being shown in vertical section, others in elevation, the valve in this instance being closed, the tank being full. Fig. 2 is a similar view, the parts being in a different position, the valve being open. Fig. 3 is a section of the valve apparatus on the plane of the line $x$—$x$ Fig. 1. Figs. 4, 5, 6, 7 and 8 are detail views of detached parts.

1 represents the valve case, which in this particular instance has a cylindrical bore in which the valve itself moves.

2 represents the main shut-off valve, the same having a cylindrical guide portion 3 located within the bore of the case 1.

4 is the supply pipe leading into a chamber 5.

6 is an outlet pipe, which communicates with a chamber 7. The chambers 5 and 7 are connected by a passage which is controlled by the main valve 2, which passage is shown as closed in Figs. 1 and 3, and as open in Fig. 2.

8 is a secondary or relief valve, which closes a passage extending through the main valve 2.

9 is a stem for the relief valve 8.

10 is a shoulder which is spaced apart somewhat from the lower end of the main valve 2 sufficiently to permit the valve 8 to be unseated as the stem 9 is lifted, after which said shoulder will abut against the lower end of the main valve, whereby, should the stem 9 be further lifted, it will positively force the main valve 2 from its seat.

11 is a small passage which connects the chamber 5 with the space above the guide 3 for the main valve. 12 is a cap which closes the upper end of said space, said cap being preferably detachably secured to the upper end of the cylindrical part 1 of the valve casing, whereby when said cap is removed access may be had to the valves.

13 is a bracket carrying a lever 14, the same being suitably connected to the valve stem 9, whereby as the lever 14 is tilted, said valve stem will be moved.

15—16 are toggle links pivoted together at 17, the toggle 15 being pivoted at 18 to the lever 14, the toggle 16 being pivoted at 19 to the bracket 13.

20 is the controlling lever pivoted on the center 19 independently of the toggle lever 16. In this particular instance, the lever 20 carries the float 21.

22 is what I will term a "toggle lug" carried by the lever 20, while 23 is another "toggle lug" carried by the toggle link 15.

24 is a stop to limit the swing of the toggle links in one direction.

25 is the toggle trip and safety arm carried by the toggle link 16.

26 represents part of a tank arranged to contain liquid.

It is to be understood that the parts I have thus far described, are merely a preferred arrangement, and that said parts may be modified in design and proportion to suit the particular exigencies of each particular case.

The operation of the device is as follows: Liquid under pressure is supplied through the pipe 4. Starting with the parts as shown in Figs. 1 and 3, it will be seen that the tank is filled to the normal intended level. In this position, the liquid supplied through pipe 4 passes through chamber 5 and through passage 11 into the space above the main valve 2 and relief valve 8, so that the pressure of said liquid on said valves is in a direction to hold the same closed. If the level of the liquid in the tank 6 is lowered, the controlling lever 20 will swing down. This movement will cause the toggle lug 22 to engage the toggle lug 23, and impart a quick powerful movement in a direction to straighten out the toggle links 15—16. This movement causes the lever 14 to tilt, first unseating the relief valve 8 and permitting the liquid above said valve to flow down through the main valve into the chamber 7 and thence through pipe 6 into the tank 26. By reason of the relative area of the passages, the water flows more rapidly past the relief valve 8 than it can flow through passage 11 into the space above said valve. This relieves the pressure on top of the main valve 2, so that the pressure of the liquid within the chamber 5 and underneath the main valve 2 will cause the same to automatically open to the position shown in Fig. 2, thus letting the liquid flow from pipe 4 and chamber 5 into chamber 7 and pipe 6, the last mentioned pipe discharging said liquid into the tank 26. If for any reason the main valve 2 should fail to open by the pressure of liquid under it, it will be forced open mechanically by the continued descent of the lever 20, for eventually, it will be seen, that the lever 20 will engage the toggle link 16 and cause this link, together with its companion link 15, to straighten out, thus tilting lever 14 and positively unseating the main valve 2. As the tank 26 is re-filling, the float 21 will rise with the rising liquid, but it will not have any effect upon the valve until the water level has reached practically its intended high level, at which time the controlling lever 20 will engage the toggle trip 25 and swing the toggles from the "dead-center" position indicated in Fig. 2 toward the position indicated in Fig. 1. This first immediately closes the relief valve, whereupon the liquid from the supply pipe 4 will pass through the passage 11 into the space above the main valve 2 and will overbalance the pressure on said valve so that the latter will quickly descend and close the passage from chamber 5 to chamber 7, thus shutting off the supply to the tank. If for any reason this closing action should not be prompt, the rising of the water level in the tank 26 would cause the lever 20, then in engagement with the toggle trip and safety 25, to swing the toggles 15—16 to the position indicated in Fig. 1, wherein the main valve 2 and the relief valve 8 are completely closed.

I have found that under all ordinary circumstances the main valve 2 will be automatically operated reliably in both directions, namely, in a direction to open quickly and in a direction to close quickly. By this arrangement the full flow of the water is guaranteed from the supply pipe 4 into the tank, while the latter is being filled, which supply is quickly cut off at the end of the filling operation without the disagreeable hissing sound, or "hammering," so common in the ordinary valves used for this purpose, and which occurs for a considerable period just prior to the final shutting off of the water. Another decided advantage arising from the improvement herein described, is found in the fact that only a short lever arm 20 need be employed, since its work on all occasions is comparatively light, it never being required to hold the valve closed, since when once closed the pressure of the supply performs that function, the cross sectional area on the upper end of the main valve being in excess of the cross sectional area of the exposed part of the lower end of said main valve when the latter is closed. Under all ordinary conditions the work of the lever arm 20 is comparatively light. The toggle arrangement, however, is such that even though considerable power were required on special occasions to move the main valve 2, in the event the same should stick, its power is quite sufficient to accomplish that end by reason of the arrangement of said linkage, which, by the way, is always supplemented by the pressure of the water from the main supply in the proper direction.

It will be observed that the operating lever has a limited amount of free movement in both directions, relatively to the toggles. This is important, in that it affords the aforesaid quick opening and quick closing operation. It will also be observed that when the valved passage is closed, there is no strain upon the operating lever 20, since the toggle links are alined on a "dead-center," or substantially so.

While I have shown a preferred embodiment of link mechanism for securing the desired results and likewise a preferred arrangement of the pressure chamber which is controlled by the relief valve 8, I am aware that a variety of modifications can be resorted to in all of these features as well as in other features before referred to, without departing from the spirit or scope of the invention, it being broadly my purpose to disclose mechanism by which a quick opening and quick closing movement of the valve mechanism is effected, said valve mechanism during its open period being fully open so as to allow the rapid flow of water from the supply pipe into the tank, for the purpose of filling the same to the intended limit, at which time a practically instant stoppage of flow occurs, without disagreeable noise.

A feature of marked importance will be seen to exist in the compound toggle arrangement whereby in securing the sure and certain closing of the valve, the toggle lugs 22—23 with their powerful toggle action first start the toggle links 15—16 from their angular position shown in Fig. 1 toward the straight position shown in Fig. 2, with the result that should the valve be stuck upon its seat, the compound toggle action first operates to partially straighten out the toggle links 15—16 with a very powerful movement, so that with a comparatively short lever arm 20 and a comparatively light ball 21, the final straightening out operation employed for forcing the main valve 2 from its seat may be successfully accomplished.

It will therefore be understood that, so far as the word "compound" is employed in the following claims, it refers to and identifies a dual coöperating toggle system employing parts similar or equivalent to the parts 15—16 and the parts 22—23.

What I claim is:

1. In a valve construction, a casing having an inlet and an outlet, a passage leading from the inlet to the outlet, a main valve for said passage, a pressure chamber above said valve, a passage communicating from the inlet to said pressure chamber, an outlet from said pressure chamber, a relief valve therefor, lever mechanism for operating said relief valve, said lever mechanism including toggle links, and an operating pivoted lever capable of limited movement independently of said links but arranged to engage and operate said links at the ends of said limited movement in both directions.

2. In a valve construction, a casing having an inlet and an outlet, a passage leading from the inlet to the outlet, a main valve for said passage, a pressure chamber above said valve, a passage communicating from the inlet to said pressure chamber, an outlet from said pressure chamber, a relief valve therefor, lever mechanism for operating said relief valve, said lever mechanism including toggle links, a pivoted lever capable of limited movement independently of said links but arranged to engage and operate said links at the ends of said limited movement in both directions, and toggle lugs, one of said lugs being carried by said operating lever, the other lug being carried by one of said toggle links.

3. In a valve mechanism, a valve casing having a passage to be controlled, a main valve for said passage, a pressure chamber above the valve arranged to receive fluid under pressure to move said main valve in a direction to close said passage, a relief valve to release the pressure in said pressure chamber to permit said main valve to open by fluid pressure, a lever for controlling said relief valve, including link mechanism arranged between said lever and said relief valve, said lever operating said link mechanism to both open and close said valve quickly, said lever having a limited amount of movement independently of said link mechanism in both directions.

4. In a valve mechanism, a valve casing having a passage to be controlled, a main valve for said passage, a pressure chamber above the valve arranged to receive fluid under pressure to move the main valve in a direction to close said passage, a relief valve to release the pressure in said pressure chamber to permit said main valve to open by fluid pressure, a lever for controlling said relief valve, including link mechanism arranged between said lever and said relief valve, said lever operating said link mechanism to both open and close said relief valve quickly, said lever having a limited amount of movement independently of said link mechanism in both directions, said link mechanism including toggle links.

5. In a valve mechanism, a valve casing having a passage to be controlled, a main valve for said passage, a pressure chamber above the valve arranged to receive fluid under pressure to move the main valve in a direction to close said passage, a relief valve to release the pressure in said pressure chamber to permit said main valve to open by fluid pressure, a lever for controlling said relief valve, including link mechanism arranged between said lever and said relief valve, said lever operating said link mechanism to both open and close said relief valve quickly, said lever having a limited amount of movement independently of said link mechanism in both directions, said link mechanism including toggle links and toggle lugs.

6. In a valve mechanism, a valve, means for operating the same, including toggle links arranged to hold said valve open, a lever to release said links to permit said valve to close, and means to permit said lever to have a limited range of free movement independently of said links.

7. In a valve mechanism, a valve, means for operating the same, including toggle links arranged to hold said valve open, and a lever to release said links to permit said valve to close, said lever coöperating with said links to move them in both directions, said lever having a limited amount of free movement without moving said links.

8. In a valve mechanism, a valve, means for operating the same including compound toggle linkage and a movable operating lever therefor, and means to permit said lever to have a limited range of free movement independently of said links.

WILLIAM H. SCHULTE.

Witnesses:
R. C. MITCHELL,
IDA M. HUNZIKER.